Fig.2

May 15, 1962 G. H. BECKMAN ETAL 3,034,199
MACHINE FOR MAKING METAL COVERED BOARDS
Filed Dec. 27, 1956 11 Sheets-Sheet 3

INVENTORS
George Harold Beckman
BY John Robert
Oomes, McDougall,
Williams & Herzl
Attorneys May 15, 1962     G. H. BECKMAN ETAL     3,034,199
MACHINE FOR MAKING METAL COVERED BOARDS
Filed Dec. 27, 1956     11 Sheets-Sheet 4

INVENTORS
George Harold Beckman
John Robert
BY
Attorneys

May 15, 1962 G. H. BECKMAN ETAL 3,034,199
MACHINE FOR MAKING METAL COVERED BOARDS
Filed Dec. 27, 1956 11 Sheets-Sheet 7

INVENTORS
George Harold Beckman
John Robert
BY Ooms, McDougall,
Williams & Hersh
Attorneys May 15, 1962 G. H. BECKMAN ETAL 3,034,199
MACHINE FOR MAKING METAL COVERED BOARDS
Filed Dec. 27, 1956 11 Sheets-Sheet 8

INVENTORS
George Harold Beckman
John Robert
BY
Ooms, McDougall,
Williams & Hersh
Attorneys

May 15, 1962    G. H. BECKMAN ETAL    3,034,199
MACHINE FOR MAKING METAL COVERED BOARDS
Filed Dec. 27, 1956    11 Sheets-Sheet 9

INVENTORS
George Harold Beckman
John Robert
BY
Ooms, McDougall,
Williams & Hersh
Attorneys United States Patent Office 3,034,199
Patented May 15, 1962

3,034,199
MACHINE FOR MAKING METAL
COVERED BOARDS
George Harold Beckman, Lowell, Ind., and John Robert, Chicago, Ill., assignors to Abbott Coburn Foundation, Chicago, Ill., a corporation of Illinois
Filed Dec. 27, 1956, Ser. No. 630,787
11 Claims. (Cl. 29—33)

This invention relates to new and improved machines for making metal-covered boards intended for use as siding or roofing boards, shingles, metal-covered table pads and the like.

One object of the present invention is to provide new and improved machines for making metal trays, feeding the metal trays onto carriers on a conveyor, feeding boards into the trays along the conveyor, and turning or folding the upstanding flanges of the trays over the edges of the boards whereby the metal trays are formed into covers for the boards.

A further object is to provide new and improved machines of the foregoing character having means for positively and accurately locating the trays on the conveyor, and means for operating the board feeding mechanism in timed relation to the movement of the conveyor, so that the boards will be fed into the trays with a high degree of precision.

Another object is to provide new and improved machines of the foregoing character having means for preventing the operation of the board feeding mechanism if a tray is missing from the conveyor.

A further object is to provide such new and improved machines having antijamming means for stopping the conveyor if any board projects above its tray after being fed into the tray.

Another object is to provide new and improved machines for making metal covered boards with efficiency and speed and at low cost.

A further object is to provide such new and improved machines which are substantially automatic in operation so as to require a minimum of attention from the operator.

Still another object is to provide new and improved methods and machines for making metal covered boards which will be attractive in appearance and highly serviceable in use.

Further objects and advantages of the present invention will appear from the following description, taken with the accompanying drawings, in which.

The present invention is applicable to the manufacture of various types of metal covered boards. For example, the present invention may be employed in making metal covered siding, metal covered roofing, metal covered table pads, and the like. Any desired or suitable metal may be employed in the covering. For example, aluminum may be employed very advantageously in making metal covered siding and roofing, but copper, zinc and other metals may be employed. The metal may have a natural finish or may be covered with baked enamel or some other suitable coating of any desired color. In making table pads, the metal covering may be composed of aluminum or any other suitable metal such as stainless steel or steel plated with chromium or the like. A lithographed metal covering may also be employed very advantageously in making tabe pads.

The present invention may be applied to the covering of any desired or suitable type of board. Thus, in making metal covered siding or roofing, the board may take the form of cellulose insulating board, hardboard, fiberboard, gypsum board, laminated felt, plywood, or any other suitable board.

The board to be covered may be composite in character. It is also feasible to cover two or more boards or sheets with metal. Thus, in making table pads, the metal cover may be applied to an assemblage comprising sheets of plain or asbestos cardboard or heavy paper. Various other possibilities, for both the board and the metal cover, will occur to those skilled in the art.

Figures 24, 25, 26, 27, 28:
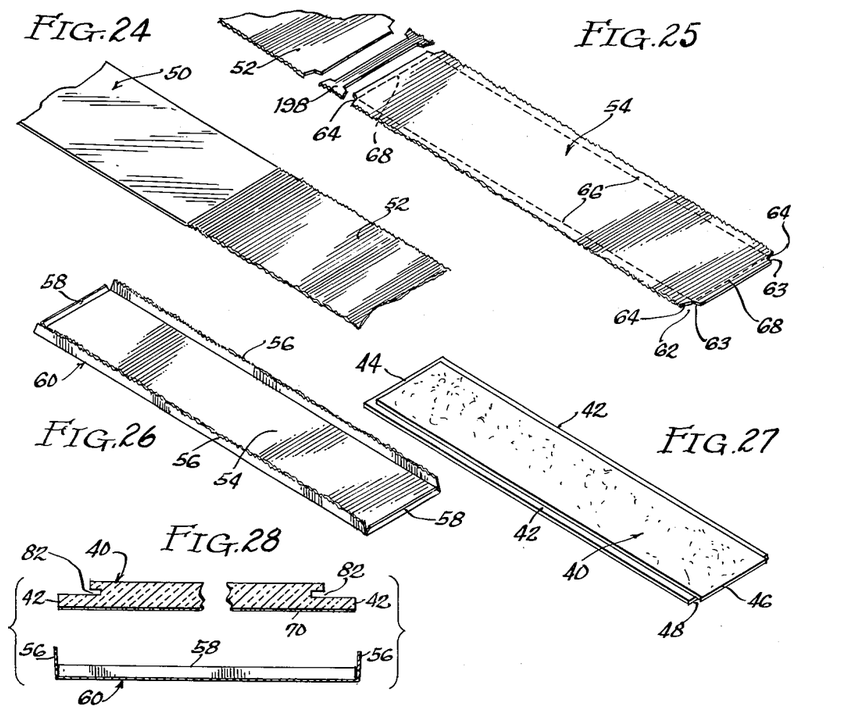
FIG. 24 is a perspective view of a sheet metal strip employed in connection with the machine of FIGS. 1 and 2.
FIG. 25 is a perspective view showing the manner in which a sheet is cut from the strip of FIG. 24.
FIG. 26 is a perspective view showing a tray which is formed from the sheet by folding upstanding edge flanges thereon.
FIG. 27 is a perspective view showing a board to be covered.
FIG. 28 is a transverse sectional view showing the board and the tray with the board in position for reception into the tray.

Thus, it is merely by way of example that FIGS. 24–31 illustrate the making of metal covered boards which are adapted to be used as metal covered siding or roofing. A board 40, to be covered with metal, is illustrated in FIG. 27. The board 40 may be composed of insulating board impregnated with asphalt. Of course, any other suitable type of board may be employed, as discussed above.

To provide for the overlapping of adjacent boards, the board 40 is formed with reduced edge portions 42 along the opposite side edges of the boards. It will be seen that both of the reduced edge portions 42 are on the same side of the board, that is, the lower side in FIG. 27.

Reduced edge portions 44 and 46 are also formed at the ends of the board 40. It will be seen that the edge portions 44 and 46 are on opposite sides of the board 40. Thus, the edge portion 44 projects from the lower side of the board in FIG. 27, while the edge portion 46 projects from the upper side of the board. A shoulder 48 is formed under the overhanging edge portion 46.

A bevel or chamfer 49a is formed along the upper portion of the reduced edge 44 at one end of the board 40. As will be explained in greater detail shortly, the end flange on the metal covering for the board 40 is adapted to be folded or ironed inwardly over the bevel so as to obviate any possibility that the edge of the flange will project outwardly. A similar bevel 49b is formed along the upper portion of the shoulder 48 at the opposite end of the board 40. The formation of this bevel 49b produces a groove 49c extending along the upper portion of the shoulder 48, immediately under the reduced end portion or flange 46.

The metal for covering the board 40 may be formed in various ways. In the method being described by way of example, the metal is cut from an elongated sheet metal strip 50 (FIG. 24). The strip 50 may have a natural or plain finish, or it may be coated with baked enamel or some other suitable finish. Natural finish aluminum may be employed very advantageously for roofing, while aluminum with a baked enamel finish makes a very attractive metal covered siding. The baked enamel or other coating need be applied to only one side of the strip 50.

While the metal strip 50 may be employed plain, it is preferred to corrugate it transversely in the method being described by way of example. Thus, FIG. 24 illustrates a corrugated end portion 52 on the strip 50. The corrugations improve the appearance of the finished metal covering. Moreover, they enhance the rigidity of the covering and provide for thermal expansion and contraction of the metal covering without any visible distortion of the metal covering or the metal covered board.

FIG. 25 illustrates a metal sheet 54 cut from the corrugated strip 52. The sheet 54 is adapted to be employed in covering the board 40. Upstanding side flanges 56 and end flanges 58 may be folded from the sheet 54, as shown in FIG. 26. In this way, the sheet 54 may be converted into a tray 60.

To define the flanges 56 and 58, corner notches 62 are formed on the sheets 54. In this case, both the side flanges 56 and the end flanges 58 are formed with outwardly tapering edges 63 and 64 (FIGS. 25 and 32) so that the tapered edges will recede from the corners of the tray 60 when the flanges are folded upwardly. In this way, there will be no projecting edges to interfere with installation of the metal covered boards in tightly abutting relation. The angle of each corner notch 62 is thus somewhat greater than a right angle to provide for the tapering of the side and end flanges 56 and 58. The taper of the edges 63 and 64 may be about fifteen degrees or some other suitable angle.

The side and edge flanges 56 and 58 are adapted to be folded upwardly along bend lines 66 and 68, shown in FIG. 25. When thus folded the flanges 56 and 58 extend in one direction from the sheet 54, as shown in FIG. 26. It will be seen that the end flanges 58 are of a width corresponding to or slightly less than the thickness of the reduced end portion 44. On the other hand, the side flanges 56 are somewhat wider than the end flanges 58. The width of the side flanges 56 is substantially greater than the thickness of the reduced edge portions 42 on the board 40.

It is preferred to apply a coating of a suitable adhesive to the underside of the board 40, before bringing the board and the tray 60 together. The coating is indicated at 70 in FIG. 28. In the method being described by way of example, it is preferred to employ hot liquid asphalt for the adhesive, but other suitable adhesives may be employed.

Figure 29:
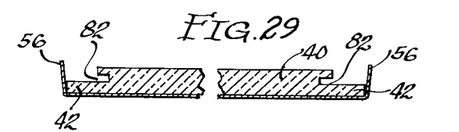
FIG. 29 is a transverse sectional view showing the board in position in the tray.
Figure 30:
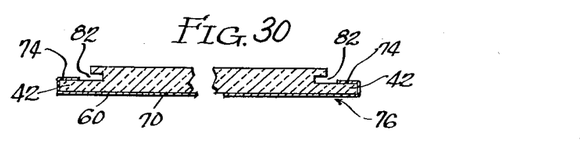
FIG. 30 is a transverse sectional view showing the finished metal-covered board, with the flanges of the tray turned inwardly over the edge portions of the board.

As shown in FIGS. 28 and 29, the board 40 and the tray 60 may be brought together by inserting the board into the tray. Next, the side flanges 56 are turned or folded inwardly over the reduced edge portions 42 of the board 40, as shown in FIG. 30. In this folding operation, the side flanges 56 are folded along bend lines 72, indicated in FIG. 32. The inturned portions of the side flanges 56 are designated 74 in FIG. 30. It is preferred to press or squeeze the edges of the metal covered board so as to seat the turned in portion 74 firmly against the reduced edge portions 42 of the board 40. In the method being described by way of example, the entire metal covered board is preferably squeezed so as to seat the metal cover 60 firmly and uniformly against the adhesive coating 70, so that the cover and the board 40 will be firmly laminated together.

Figure 31:
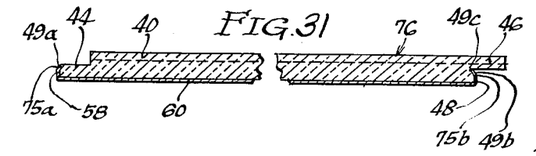
FIG. 31 is a longitudinal sectional view of the finished board.
Figures 32, 33, 34, 35:
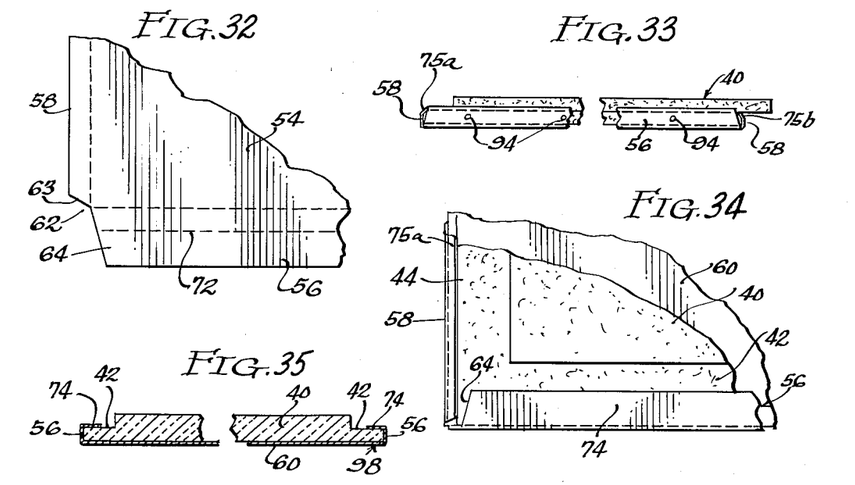
FIG. 32 is a fragmentary plan view showing the corner arrangement of the metal sheet illustrated in FIG. 25.
FIG. 33 is an elevational view looking edgewise at the finished metal-covered board of FIGS. 30 and 31.
FIG. 34 is a fragmentary enlarged plan view showing the corner construction of the finished board of FIGS. 30 and 31.
FIG. 35 is a transverse sectional view, similar to FIG. 30, but showing a slightly modified board.

The end flanges 58 are preferably ironed or pressed firmly against the ends of the board 40 and are folded inwardly over the bevels 49a and 49b, as shown in FIGS. 31 and 33. One of the end flanges 58 is pressed against the reduced portion or flange 44 on the board 40, while the other flange 58 is pressed against the shoulder 48. It will be seen that marginal portions 75a and 75b on the flanges 58 are folded inwardly at about forty-five degrees over the bevels 49a and 49b. By virtue of this arrangement, the end flanges 58 are straight and true, and the upper portions 75a and 75b of the end flanges are formed inwardly so that they will not interfere with the installation of the metal covered boards with the ends of adjacent boards tightly abutted together. The complete metal covered board is designated 76 in the drawings (FIGS. 30 and 31).

To accommodate the nailing strip or the like, the board 40 is provided with undercut longitudinal grooves 82.

It is preferred to perforate the side flanges 56 along the edge of the board 76, so as to form a plurality of drainage or weep holes 94. Any moisture that may get into the board 76 can drain or evaporate through the holes 94.

FIG. 35 illustrates modified boards 98 which do not have the undercut grooves 82, but otherwise may be the same as the boards 76. The end flanges 58 on adjacent boards 98 may be tightly abutted together. It will be seen from FIG. 34 that the tapered edges 64 of the side flanges 56 recede from the end flanges 58 and thus do not interfere with the tight abutting of the adjacent boards.

Figures 36, 37:
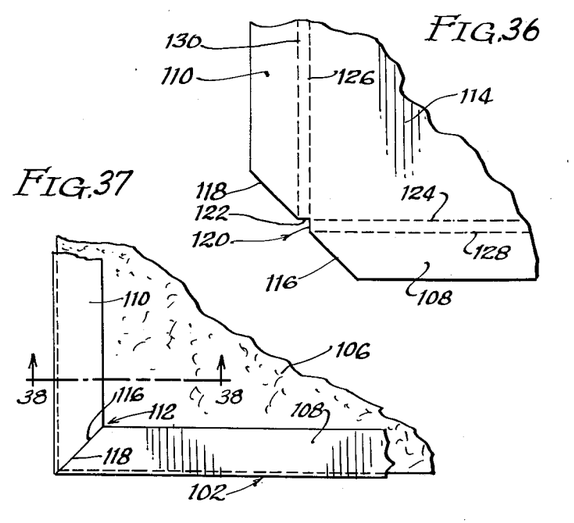
FIG. 36 is a fragmentary plan view of a modified metal sheet employed in making a modified metal-covered board.
FIG. 37 is a fragmentary plan view of the modified board covered with the metal sheet of FIG. 36, the metal cover having turned over side and end flanges with a miter joint therebetween.
Figure 38:
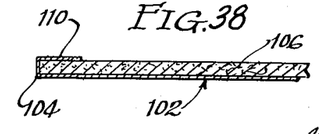
FIG. 38 is a fragmentary elevational sectional view taken generally along the line 38—38 in FIG. 37.

By way of further example, FIGS. 36–38 illustrate a method of making another somewhat modified metal covered board 102. As before, the board 102 comprises a sheet metal cover 104 mounted on one side of an insulating board 106 or any other suitable type of board, as already discussed. In this case, however, the metal cover 104 is formed with side and end flanges 108 and 110, which are folded over the edge portions of the insulating board 106 and are arranged to meet in a miter joint 112. The insulating board 106 is of plain, rectangular form and is not provided with the edge portions of reduced thickness which are employed on the insulating board 40 of FIG. 27.

The metal cover 104 is formed from a metal sheet 114 which may be cut from an elongated strip of sheet metal, or may otherwise be formed in a suitable manner. It will be seen from FIG. 36 that the sheet 114 is generally rectangular in shape. However, the corners of the sheet 114 are cut diagonally to form diagonally tapered edges 116 and 118 on the side and end flanges 108 and 110. A small rectangular notch 120 is also cut in each corner of the sheet 114 to define square, untapered edge portions 120 and 122, adjacent the bases of the flanges 108 and 110.

The side and end flanges 108 and 110 are adapted to be folded upwardly at right angles to the sheet 114 along fold lines 124 and 126. When the flanges 108 and 110 are thus folded, the sheet 114 is formed into a tray with the edge portions 120 and 122 meeting along vertical lines. The insulating board 106 may be inserted into the tray, as before, with an adhesive material between the board and the tray. Then, the side and end flanges 108 and 110 may be folded inwardly along fold lines 128 and 130 so that the diagonal edges 116 and 118 will meet to form the miter joints 112 at the corners of the metal covered board 102. Squeezing pressure may be applied to the metal covered board 102 so as to press the metal cover 104 into firm, uniform engagement with the insulating board 106. The side and end flanges 108 and 110 may also be pressed or ironed down firmly against the insulating board 106.

FIGS. 1–21 illustrate a machine 140 which is adapted to make metal covered insulating boards of the types shown in FIGS. 24–25. With slight modifications, the machine 140 will also make the modified metal covered boards 102 shown in FIGS. 36–38. The machine 140 will be described specifically by way of example, but it will be understood that the construction of the machine may be varied considerably within the scope of the present invention.

In the illustrative machine 140, the sheet metal strip 50 is withdrawn from a supply roll 142 (FIGS. 1 and 2) which is supported by a rotatable shaft 144. The strip 50 is corrugated by being fed between upper and lower corrugated metal rollers 144 and 146 which are suitably pressed together, with the strip 50 therebetween, and are power driven at constant speed. An idler roller 148 guides the strip 50 into the nip between the corrugated rollers 144 and 146.

The corrugated strip 52, produced by the corrugating rollers 144 and 146, is fed intermittently over a table 150 by upper and lower feed rollers 152 and 154 made of rubber or other similar soft material. By a suitable intermittent driving mechanism, the feed rollers 152 and 154 are driven intermittently so that a predetermined length of the corrugated strip 52 will be fed onto the table 150, whereupon the strip will stop on the table so that one of the sheets 54 may be cut therefrom and may be formed into one of the trays 60. The corrugated strip 52 is allowed to hang in a depending loop 155 between the corrugating rollers and the feed rollers so as to provide slack to permit the feed rollers 152 and 154 to be driven intermittently, while the corrugating rollers 144 and 146 are driven at constant speed. A curved apron or plate 158 guides the corrugated strip 52 into the nip between the feed rollers 152 and 154. Bars or guides 160 are spaced closely above the table 150 to hold down the corrugated strip 52 and prevent it from buckling upwardly.

By the action of the feed rollers 152 and 154, the corrugated strip 52 is fed over a die opening 162 formed in the table 150. When the strip 52 comes to rest on the table 150, a sheet 54 is cut from the leading end of the strip by upper and lower shearing knives 164 and 166. The opposite end of the sheet 154 is trimmed by upper and lower shearing knives 168 and 170. While the sheet 54 is being cut and trimmed, it is held against the table 150 by a pair of clamping bars 172 which are engageable with the longitudinal edges of the strip 52.

Figure 3:
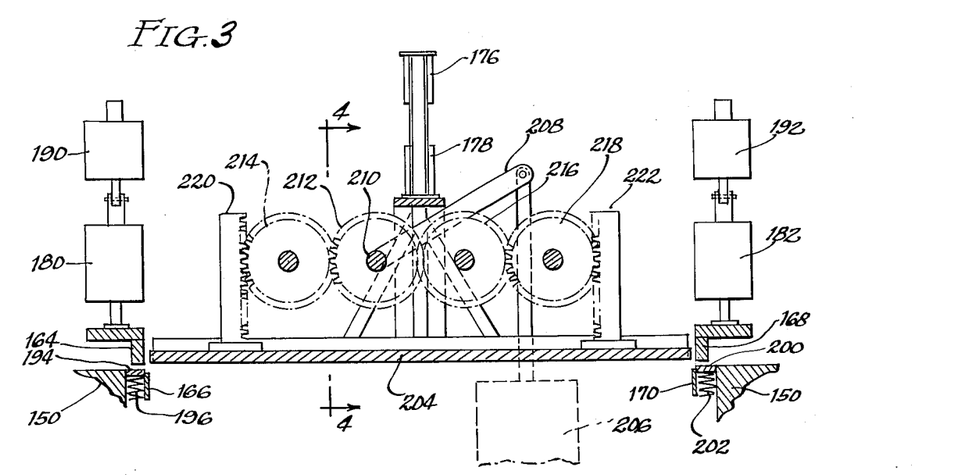
FIG. 3 is an elevational sectional view showing a mechanism employed in the machine of FIGS. 1 and 2 for cutting and folding metal sheets.
Figure 4:
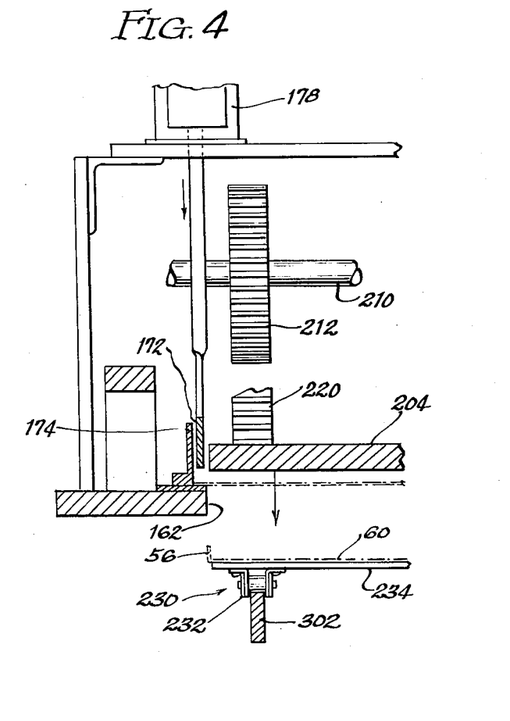
FIG. 4 is a fragmentary cross sectional view taken generally along a line 4—4 in FIG. 3.
Figures 5, 11:
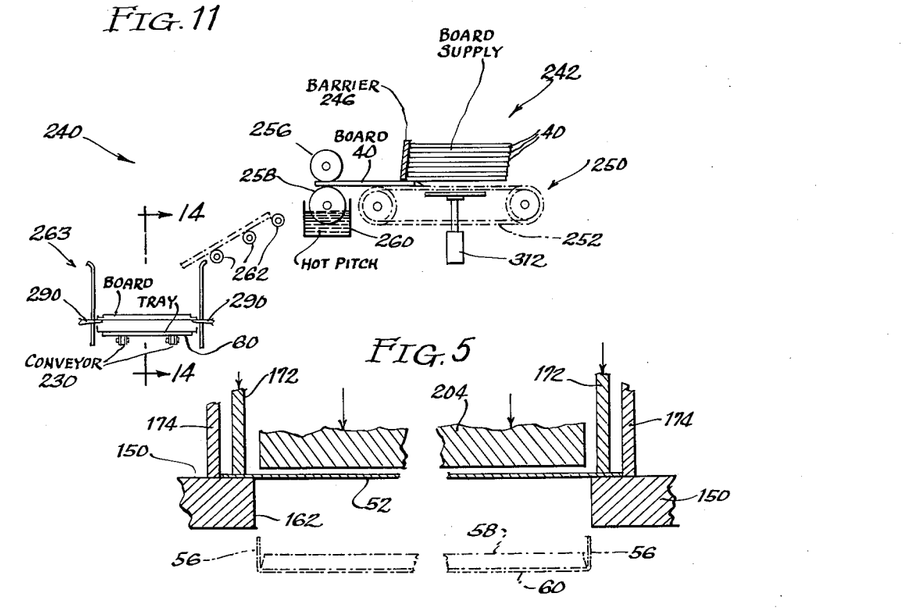
FIG. 5 is a view somewhat similar to FIG. 4, but showing some of the parts in changed positions.
FIG. 11 is a diagrammatic elevational view of a mechanism, employed in the machine of FIGS. 1 and 2, for feeding the boards from a magazine and dropping the boards into the sheet metal trays.
Figure 6:
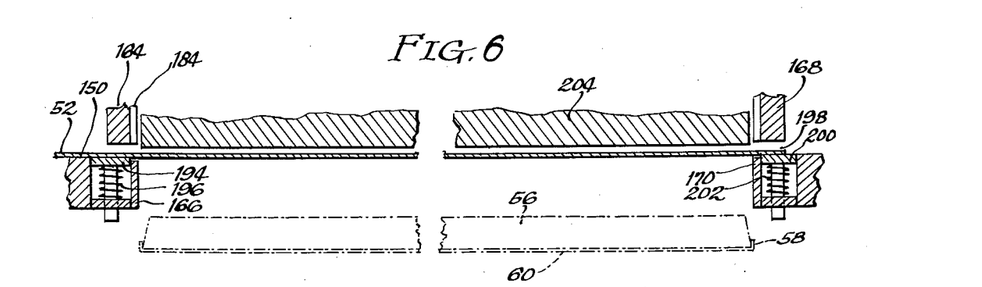
FIG. 6 is a fragmentary enlarged elevational sectional view somewhat similar to FIG. 3, but showing additional details.
Figure 7:
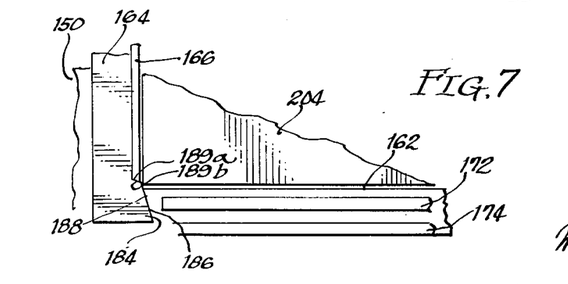
FIG. 7 is a fragmentary plan view of the cutting and folding mechanism of FIGS. 3–6.

As shown in FIGS. 4 and 5, the corrugated strip 52 is centered laterally over the die opening 162 by being fed between a pair of side guides 174 which extend upwardly from the table 150. While the strip 52 is being fed over the table 150, the clamping bars 172 are raised by suitable means, such as illustrated solenoids 176 (FIG. 3). The raised position of the bars 172 is shown in FIG. 4. After the strip 52 has come to rest over the table 150, the clamping bars 172 are moved downwardly by suitable means, such as the illustrated solenoids 178, so as to clamp the edges of the strip 52 against the table 150, adjacent the side guides 174.

The clamping bars 172 prevent movement of the strip 52 while the sheet 54 is being cut therefrom.

After the clamping bars 172 have immobilized the strip 52, the upper shearing knives 164 and 168 are moved downwardly into shearing relation with the stationary lower knives 166 and 170 by suitable means, such as the illustrated solenoids 180 and 182 (FIG. 3). It will be seen from FIG. 7 that the upper knives 164 and 168 are formed with projecting end portions 184 which are shaped to cut out the corner notches in the sheets 54. Thus, each notching portion 184 is formed with a slightly diagonal edge 186 to cut the tapered edges 64 on the side flanges 56 of the sheets 54. Each diagonal edge 186 cooperates with a complementary stationary edge 188 formed on the table 150 at the end of the corresponding lower knife. Diagonal edges 189a and 189b are formed on the upper and lower knives to cut the tapered edges 63 on the end flanges 58.

After the sheet 54 has been cut from the strip 52, the upper knives 164 and 168 are retracted upwardly by suitable means, such as the illustrated solenoids 190 and 192. The severed edge of the strip 52 is pushed upwardly and stripped away from the lower knife 166 by a stripper bar or plate 194 which is biased upwardly by coil springs 196. The bar 194 is normally flush with the top of the table 150 but is movable downwardly, against the resistance of the springs 196, when the upper knife 164 is moved downwardly. When the upper knife 164 is raised, the stripper 194 pushes the severed edge of the strip 52 above the upper edge of the lower knife 166, so that the strip 52 will be in position to be fed across the table without interference from the lower knife 166.

At the other end of the sheet 54, a waste strip 198 is trimmed from the sheet by the upper and lower knives 168 and 170. In trimming away the waste strip 198, the corner notches are formed in the leading edge of the sheet 54. A stripper bar 200 may also be provided under the knife 168, to push the waste strip 198 upwardly to the level of the table 150 so as to free the waste strip from the lower knife 170. The waste strip 198 may be blown away from the knife 170 and off the table 150 with a timed air blast, or may otherwise be suitably removed. Springs 202 may be provided to bias the stripper 200 upwardly.

Next, the side and end flanges 56 and 58 are folded upwardly from the sheet 54 by pushing the sheet downwardly through the die opening 162. Before this is done, the clamping bars 172 are moved upwardly so as to release the sheet 54. A die or plate 204 is then moved downwardly against the sheet 54 so as to push it through the die opening 162. The die opening 162 and the die 204 are rectangular in shape and are somewhat smaller than the sheet 54 so that the flanges 56 and 58 will be formed on the sheet as it is pushed through the opening 162. It will be seen that the die 204 is slightly smaller than the die opening 162 to provide clearance for the flanges 56 and 58.

Any suitable means may be provided to push the die plate 204 downwardly through the die opening 162. In the illustrated machine, the die plate 204 is operated by an air cylinder 206 which is connected to an arm 208 on a rotatable shaft 210. A gear 212 is secured to the shaft 210 and is arranged to mesh with gears 214 and 216. A fourth gear 218 meshes with the gear 216. It will be seen that the gears 214 and 218 mesh with vertical racks 220 and 222 connected to the die plate 204. Thus, the air cylinder 206 is effective to move the die plate 204 upwardly and downwardly.

The die plate 204 pushes the tray 60 downwardly through the die opening 162. From the die opening 162, the tray 60 drops onto an underlying conveyor 230 which operates continuously at constant speed. It will be seen from FIGS. 1 and 14 that the conveyor 230 comprises a pair of endless chains 232 with slats 234 of wood or the like extending therebetween to support the trays 60. Several sets of the slats 234 are spaced along the conveyor 230.

A pusher bar 236 projects upwardly from the trailing slat of each set of slats 234 on the conveyor 230, so as to be engageable with the rear edge of one of the trays 60 for pushing the tray. It will be seen from FIGS. 8 and 9 that each pusher bar 236 is formed with an overhanging flange or lip 236a extending along its upper edge. Thus, a groove or recess 236b is formed in the front surface of the pusher bar 236, under the overhanging flange 236a. The rear end flange 58 of the tray 60 is adapted to be received in the groove or recess 236b so that the upper edge of the flange 58 will be covered by the overhanging lip 236a. In this way, the lip 236a prevents the subsequently dropped board 40 from hanging up on the rear flange 58.

On the leading slat of each set of slats 234 on the conveyor 230, a front stop or flange 237 projects upwardly. When the tray 60 is properly positioned on the conveyor 230, it is disposed between the pusher bar 236 and the front stop 237. Thus, the correct position of the tray 60 on the conveyor 230 is positively maintained.

Figures 8, 9, 10:
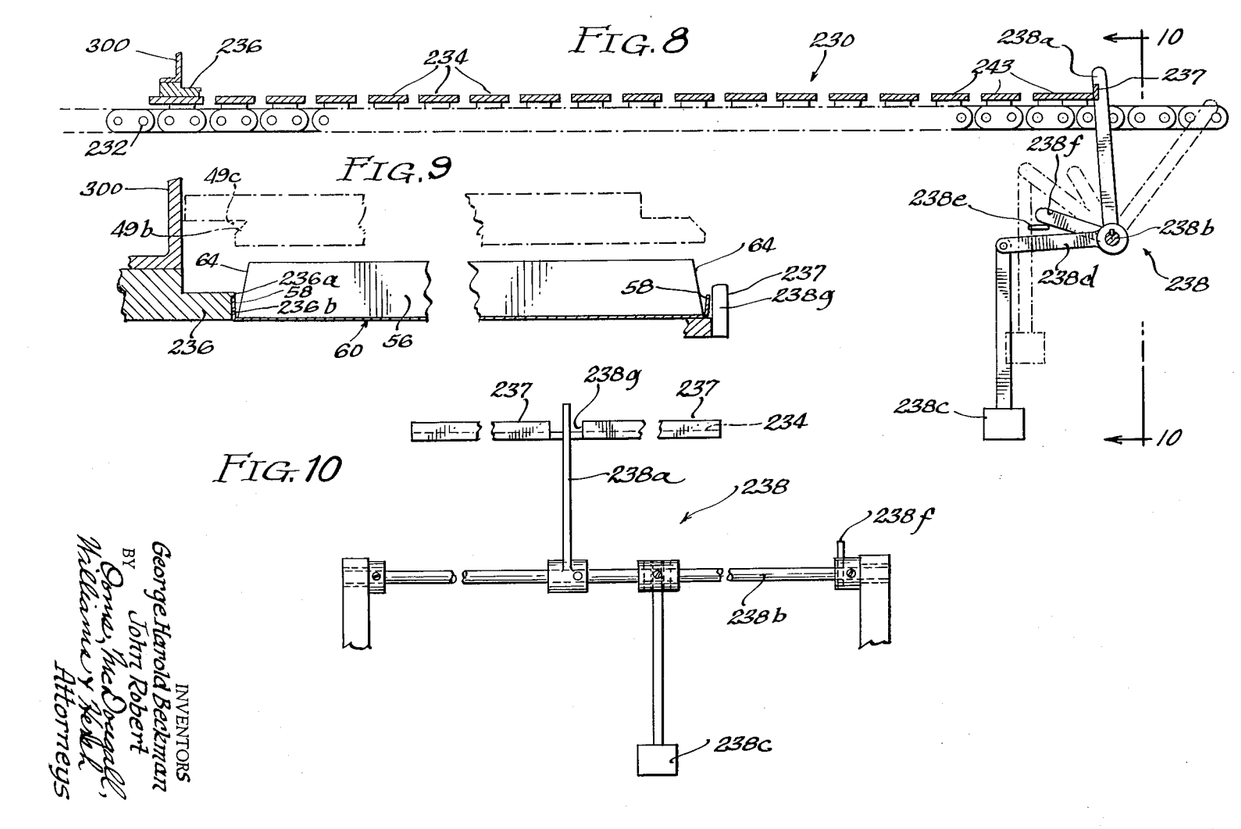
FIG. 8 is a longitudinal elevational sectional view taken through the conveyor which carries the folded metal sheets or trays from the cutting and folding mechanism to a station at which a board is dropped into each tray.
FIG. 9 is a fragmentary enlarged elevational sectional view which is similar to FIG. 8, but is arranged to show with greater clarity the manner in which the trays are carried on the conveyor, and the manner in which the boards are dropped.
FIG. 10 is a fragmentary transverse elevational view, taken generally along a line 10—10 in FIG. 8.
Figure 12:
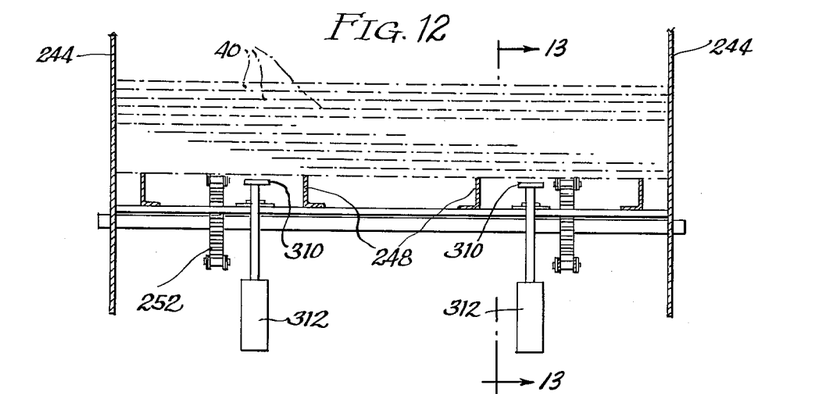
FIG. 12 is an elevational sectional view of the board magazine shown in FIG. 11.

The conveyor 230 is timed so that each successive tray 60 will be dropped between the pusher bar 236 and the front stop 237 on the underlying set of slats 234. The timing is such that any slight error in timing will result in the trays being dropped slightly ahead of its correct position, and in no case behind its correct position. Provision is then made along the conveyor 230 to retard or hold back any tray that may have been dropped ahead of its correct position, so that the tray will be pushed rearwardly against the pusher bar 236. Thus, a tray retarding mechanism 238 is provided, as shown in FIGS. 8 and 10. The mechanism 238 comprises a member 238a which extends into the path of each tray 60 as it moves along with the conveyor 230. In the machine being described by way of example, the member 238a takes the form of a swingable arm which is secured to a shaft 238b, disposed below the conveyor 230, and is arranged to project upwardly into the path of the trays. The normal position of the arm 238a is generally vertical, but the arm actually extends rearwardly at a small angle to the vertical. The retarding arm 238 is yieldably biased toward this position by a weight 238c suspended from a generally horizontal arm 238d, also secured to the shaft 238b. The normal position of the retarding arm 238a is defined by a fixed stop 238e which is engageable by a stop arm 238f secured to the shaft 238b. An opening or break 238g is provided in the front stop 237 to admit the retarding arm 238a.

As already indicated, the retarding arm 238a is positioned in the path of any tray 60 that may have been dropped on the conveyor 230 in advance of its correct position. The front edge of the tray 60 engages the retarding arm 238a, with the result that the tray is held back until its rear edge engages the pusher bar 236. The front edge of the tray 60 then falls behind the front stop 237. As the conveyor 230 continues to advance, the retarding arm 238a is swung forwardly by the leading slat 234 so that the slats will pass over the arm. The forwardly swung position of the arm 238a is shown in broken lines in FIG. 8. The arm 238a is returned into its normal position after all of the slats 234 in the set have passed over the arm. Thus, the arm 238a is positioned in the path of the next set of slats and the tray carried thereby.

The conveyor 230 carries the trays 60 to a board feeding and dropping mechanism 240 which drops one of the insulating boards 40 into each tray. In the illustrated board feeding mechanism, a supply of the insulating boards 40 is stacked in a magazine 242 having a pair of end walls 244 and a front barrier wall 246. The rear of the magazine 242 is left open so that boards may readily be placed in the magazine.

The lowermost board 40 in the magazine 242 is slidably supported on a plurality of rails 248, for movement under the lower edge of the front barrier wall 246. It will be seen that the lower edge of the barrier 246 is spaced above the level of the rails 248 by an amount slightly greater than the thickness of the individual boards 40. Thus, only the lowermost board 40 can pass under the barrier 246.

The lowermost board 40 is pushed from the magazine 242 by a conveyor 250 which operates continuously under the magazine 242. It will be seen that the conveyor 250 comprises a pair of endless chains 252 with one or more pushers 254 projecting therefrom so as to be engageable with the lowermost board.

Figure 13:
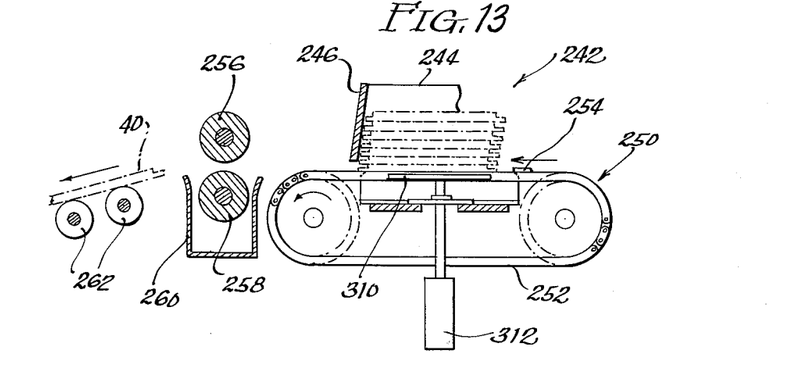
FIG. 13 is a sectional view taken generally along a line 13—13 in FIG. 12.

In the illustrated board feeding mechanism 240, a suitable adhesive is applied to the underside of each board after it has been fed from the magazine 242. As shown in FIG. 13, the conveyor 250 pushes the board between upper and lower power driven rollers 256 and 258 which may be made of metal. The lower roller 258 is partly immersed in melted asphalt, or some other suitable adhesive, contained in a trough 260. The upper roller 256 holds the board against the lower roller 258 so that the asphalt will be transferred from the roller 258 to the underside of the board. The adhesive coated board is then delivered onto a series of narrow power driven rollers or wheels 262 which carry the board downwardly and forwardly to a board dropping mechanism 263. It will be seen that the board dropping mechanism 263 comprises a hopper-like structure 264 having a pair of steeply sloping side walls or guide plates 266, a vertical front wall or plate 268, and a rear wall or guide plate 270 having a steeply sloping upper portion 272. The hopper structure 264 is effective to locate the board 40 over the conveyor 230.

The board 40 is dropped in two stages in order to insure that the board will be in the proper location and position when it is dropped. Thus, the board 40 is caught initially by a pair of bars 274 which are movable under the end guide plates 266 and are adapted to be engaged by the end portions of the board 40. Suitable gas burners 276 or other heating devices are provided to heat the bars 274 so that asphalt will not accumulate thereon. All other elements that come into contact with the asphalt-coated boards may be similarly heated.

Figure 14:
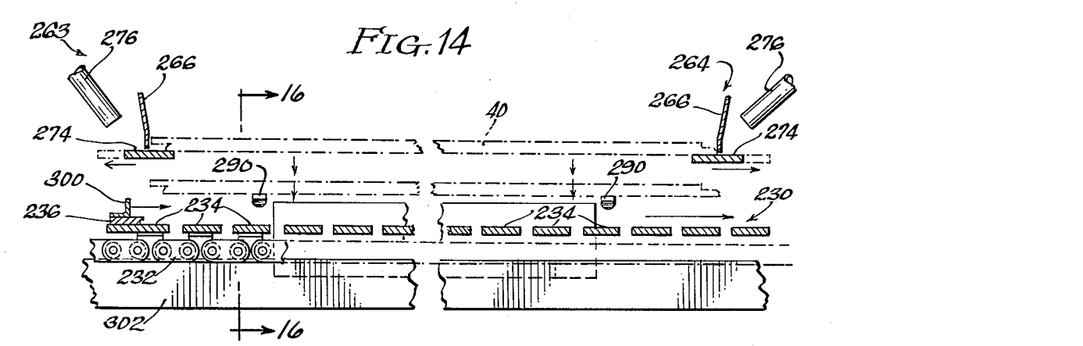
FIG. 14 is an elevational sectional view showing the mechanism for dropping the boards into the sheet metal trays.
Figure 15:
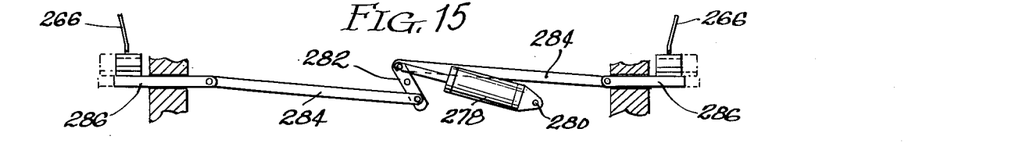
FIG. 15 is a fragmentary diagrammatic elevational sectional view showing a portion of the mechanism for dropping the boards.
Figure 16:
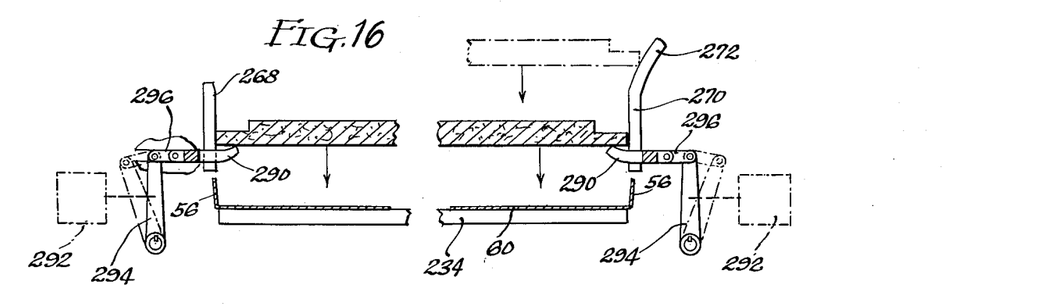
FIG. 16 is a sectional view taken generally along a line 16—16 in FIG. 14.
Figure 17:
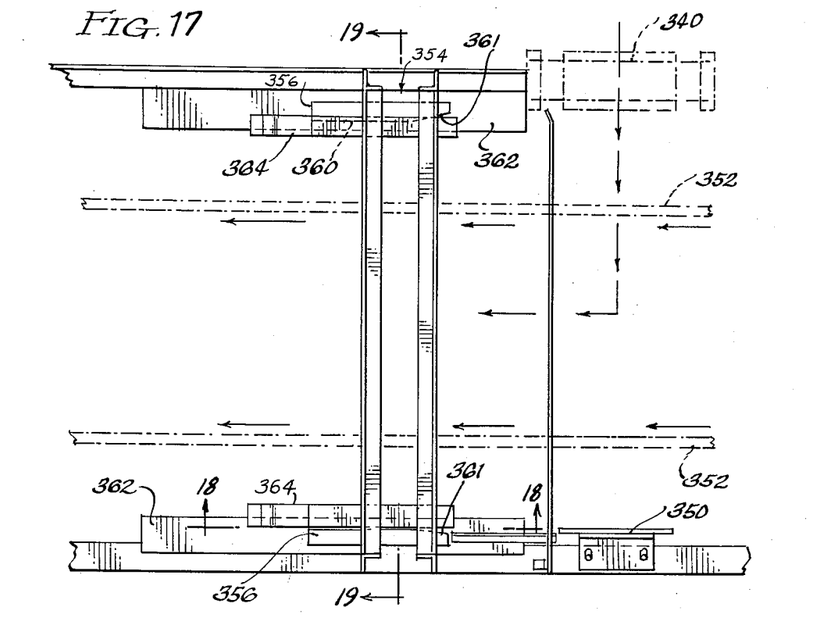
FIG. 17 is a plan view showing a mechanism, employed in the machine of FIGS. 1 and 2, for pressing the end flanges on the metal covered board.
Figure 18:
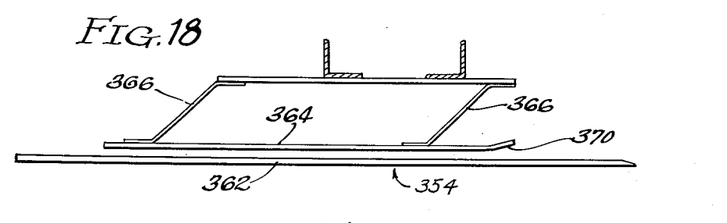
FIG. 18 is a fragmentary elevational sectional view taken generally along a line 18—18 in FIG. 17.
Figure 19:
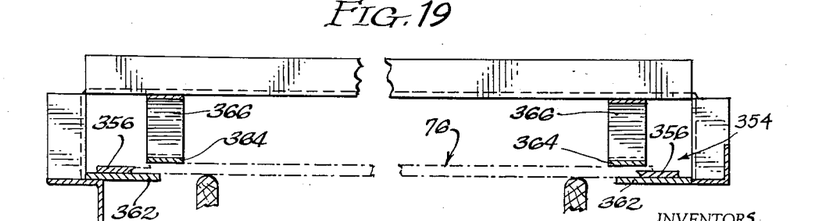
FIG. 19 is a fragmentary elevational sectional view taken generally along a line 19—19 in FIG. 17.

In FIG. 14, the bars 274 are shown in their advanced positions in which they are effective to arrest the downward movement of the board 40. The retracted positions of the bars 274 are indicated in dotted lines. Suitable means are provided to move the bars 274 into their retracted positions so as to release the board for further downward movement. In this case, the bars 274 are operated by an air cylinder 278 which is mounted on a pivot 280 and is arranged to operate a crank 282. Links 284 are connected between the crank 282 and slides 286 which support the bars 274.

The board 40 drops from the bars 274 onto fingers 290 which are positioned so as to be engaged by the extreme edge portions of the board. In this case, two of the fingers 290 are provided on each side of the board. Means are provided to withdraw the fingers 290 so as to drop the board onto one of the trays 60 carried by the conveyor 230. In this case, the fingers 290 are operated by solenoids 292 which are connected to arms 294. Links 296 extend between the arms 294 and the fingers 290. The solenoids 292 are controlled by a switch 298 which is tripped by the tray 60 as it passes under the board dropping station. Thus, the movement of the tray times the dropping of the board. A bar 300 projects downwardly from each of the pusher bars 236 to push the board 40 as it is carried on the conveyor 230. It will be seen from FIG. 14 that horizontal rails 302 are provided under the conveyor chains 232 so as to support the chains and guide them along horizontal paths.

The board feeding and dropping mechanism 240 is arranged to prevent the feeding of a board from the magazine 242 if any tray is missing on the conveyor 230. In this case, the feeding mechanism is adapted to be disabled by raising the stack of boards in the magazine 242 so that the pushers 254 will miss the lowermost board. The stack of boards is adapted to be elevated by lift bars 310 which are operated by air cylinders 312. The operation of the air cylinders 312 is controlled by a switch 314 positioned along the conveyor 230 somewhat in advance of the board dropping station. Normally, each tray on the conveyor 230 engages and operates the switch 314 as the tray is advanced to the board dropping station. The operation of the switch causes the air cylinders 312 to lower the stack of boards in the magazine 242. Accordingly, the lowermost board is fed from the magazine. After the tray has passed the switch 314, the air cylinders 312 raise the stack of boards out of reach of the pushers 254. If a tray is missing on the conveyor 230, the switch 314 is not operated, with the result that the air cylinders 312 hold the stack of boards in their raised position and prevent the conveyor 250 from feeding the lowermost board from the magazine 242.

A jam switch 316 is pushed above the conveyor 230 immediately beyond the board dropping mechanism 263, to stop the conveyor 230 if any board 40 is above its normal level on the conveyor. If the board 40 drops normally into the underlying tray, the jam switch 316 is not operated.

Next, the side flanges 56 are turned or folded inwardly over the board 40. In this case, this is accomplished by a pair of turnover bars 320 which extend along the edges of the conveyor 230. It will be seen from FIGS. 1 and 2 that the bars 320 have vertical entrance portions 322 and horizontal exit portions 324. Between the entrance and exit portions 322 and 324, the bars have twisted portions 326 which are effective to turn the side flanges 56 inwardly. It will be understood that the conveyor 230 pushes the assembled boards 40 and trays 60 between and under the turnover bars 320. As the boards emerge from under the turnover bars 320, they pass under corrugated pressing rollers 328 which engage the inturned flanges 56 and press them firmly downwardly against the boards 40. The rollers 328 also tend to recorrugate the flanges 58. The rollers 328 may be biased downwardly by their own weight.

From the pressing rollers 328, the partially completed boards 76 pass between edge perforating devices which form the weep holes 94. The edge perforating devices take the form of a pair of horizontal rollers 330 having a plurality of sharply pointed needle punches 332 projecting outwardly therefrom for engagement with the edges of the metal covered boards 76. The wheels or rollers 330 are mounted on swingable arms 334 for inward movement against the boards 76, and are biased inwardly by a spring 336 which is connected between the arms 334.

The conveyor 230 delivers the metal covered boards 76 to upper and lower power driven pressure rollers 340 and 342 which squeeze the metal cover 60 against the board 40 so that the metal cover will be substantially smooth and uniformly bonded with the insulating board 40. The upper roller 340 may be made of metal, while the lower roller 342 may be made of rubber or other soft material.

In order to bring about a ninety degree change of direction in the movement of the boards 76, the pressure rollers 340 and 342 are arranged to deliver the boards 76 onto a series of idler rollers 346 mounted on a vertically movable platform 348. A suitable wall 350 is adapted to be engaged by the leading end of the board 76 so as to arrest the endwise movement of the board. After the board 76 is on the rollers 346, the platform 348 is lowered by suitable power driven means, so as to lower the board 76 onto a series of rollers 351 rotatable at right angles to the direction of rotation of the rollers 346. A conveyor 352 carries off the boards 76 at right angles to their direction of movement on the conveyor 230. Thus, the conveyor 352 carries the boards sidewise rather than endwise.

The conveyor 352 carries the boards to a mechanism 354 which irons the end flanges 58 against the insulating board 40, so that the outer surfaces of the end flanges 58 will be straight and true. The mechanism 354 also turns the upper edges 75a and 75b of the flanges 58 inwardly over the bevels 49a and 49b. In this way, the end flanges 58 on adjacent metal covered boards 76 may be closely abutted together so as to form a tight joint.

Figure 20:
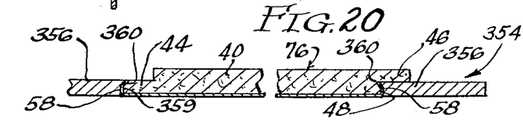
FIG. 20 is a fragmentary enlarged view somewhat similar to FIG. 19, but showing certain details with greater clarity.

The ironing mechanism 354 is shown to best advantage in FIGS. 17–20. It will be seen that the conveyor 352 pushes each of the metal covered boards 76 between a pair of ironing members or bars 356. In this case, each ironing member 356 takes the form of a bar or plate having a lower vertically extending edge portion 359 and an upper inclined edge portion 360 adapted to turn the corresponding end flange 58 inwardly over the corresponding bevel 49a or 49b on the insulating board 40. The sloping upper edge portion 360 overhangs the vertical lower edge portion 359 and may be inclined at an angle of about forty five degrees or some other suitable angle. One of the ironing bars 356 forms the inturned flange portion 75a, while the other ironing bar forms the inturned flange portion 75b. The thickness of the ironing bars 356 is such that the overhanging flange 46 on the insulating board 40 may pass along the upper surface of one of the ironing bars 356, as shown in FIG. 20. Each ironing bar 356 has a flared or tapered entrance portion 361 so as to facilitate the entry of the metal covered board between the ironing bars. After the metal covered board 76 is pushed between the ironing bars 356, the end flanges 58 are straight and true, and the edge portions 75a and 75b are turned inwardly so that they cannot interfere with the tight abutting of adjacent boards.

The ironing bars 356 are mounted on supporting plates 362 adapted to support the end portions of the metal covered board 76 as it passes through the ironing mechanism 354. The board 76 is held down against the plates 362 by a pair of shoes 364, each of which is supported by a pair of inclined leaf springs 366. Thus, the shoes 364 are adapted to apply spring pressure against the upper side of the metal covered board 76 so as to insure that the ends of the board will remain in engagement with the ironing bars 356. Each of the shoes 364 has an upwardly flared or bent entrance portion 370.

From the edge ironing mechanism 354, the conveyor 352 carries the metal covered boards 76 to a series of rollers 380 which are arranged on an upward incline so as to carry the boards upwardly. At the top of the incline, the boards are engaged by a pair of power driven rollers 382 made of sponge rubber or other soft material. The rollers 382 carry the boards 76 over the top of the incline and onto a series of downwardly inclined rollers 384, which direct the boards onto a power driven turnover spider 386. It will be seen that the turnover spider 386 comprises a plurality of arms 388 which extend radially from a rotatable horizontal shaft 390. Annular collars or pads 392 are mounted on the shaft 390 to support the edges of the boards 76 and to prevent the edges from being marred. The rotating arms 388 are effective to turn over the boards 76 and deposit them on a conveyor 394.

Figure 1:
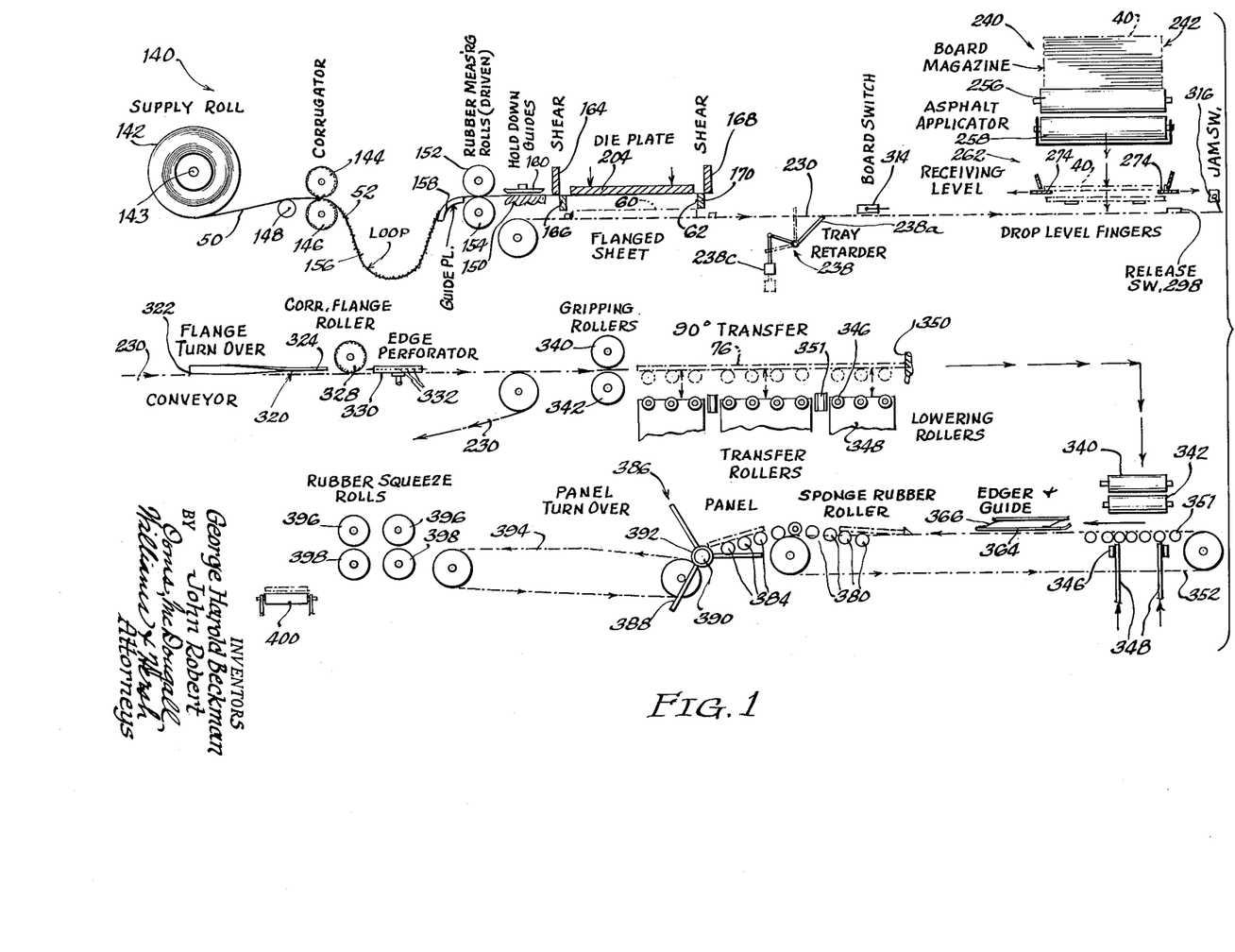
FIG. 1 is a diagrammatic elevational view of an exemplary machine for making metal covered boards.

It will be seen from FIG. 1 that the conveyor 394 feeds the boards between two pairs of upper and lower pressure rollers 396 and 398, all of which may be made of soft rubber. The rollers 396 and 398 are arranged to apply squeezing pressure to the boards 76 so as to insure that the metal cover will be firmly and uniformly bonded to the insulating board 40 by the cement coating 70. The finished boards may be stacked on a roller-type conveyor 400 adapted to carry the boards to a packaging station, at which they may be packed into suitable shipping cartons or the like.

With slight modifications, the machine 140 may be adapted to make the modified metal covered boards 102 shown in FIGS. 36–38. The necessary modifications are illustrated in FIGS. 21, 22 and 23.

Figure 21:
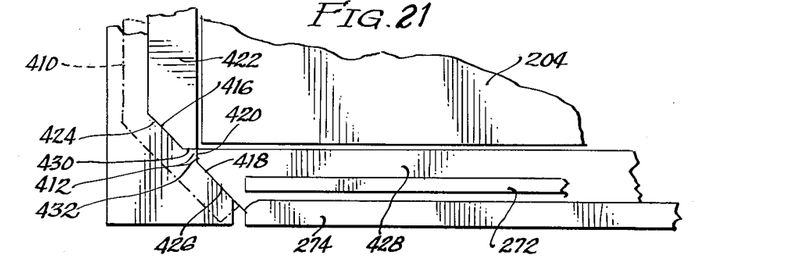
FIG. 21 is a fragmentary plan view showing a modified cutting mechanism.

In order to form the diagonal corner edges 116 and 118, the cutting mechanism is modified, as shown in FIG. 21, so as to provide an upper knife 410 having an end portion 412 formed with diagonal edges 416 and 418 with a rectangular projection 420 therebetween. It will be apparent that the rectangular projection 420 is adapted to form the rectangular corner notch 120 in the metal sheet 114, shown in FIG. 36. A modified lower knife 422 is provided to cooperate with the upper knife 410. It will be seen from FIG. 21 that the lower knife has a diagonal edge 424 which cooperates with the edge 416 on the upper knife 410. A diagonal edge 426 is provided on the slightly modified table 428 to cooperate with the other diagonal edge 418 on the upper knife 410. It will be seen that rectangularly related edges 430 and 432 are formed on the lower knife 422 and the table 428 to cooperate with the notching projection 420 on the upper knife 410. The modified arrangement shown in FIG. 21 is duplicated at the opposite end of the cutting mechanism. In other respects, the cutting mechanism may be the same as illustrated in FIGS. 1–7.

Figure 2:
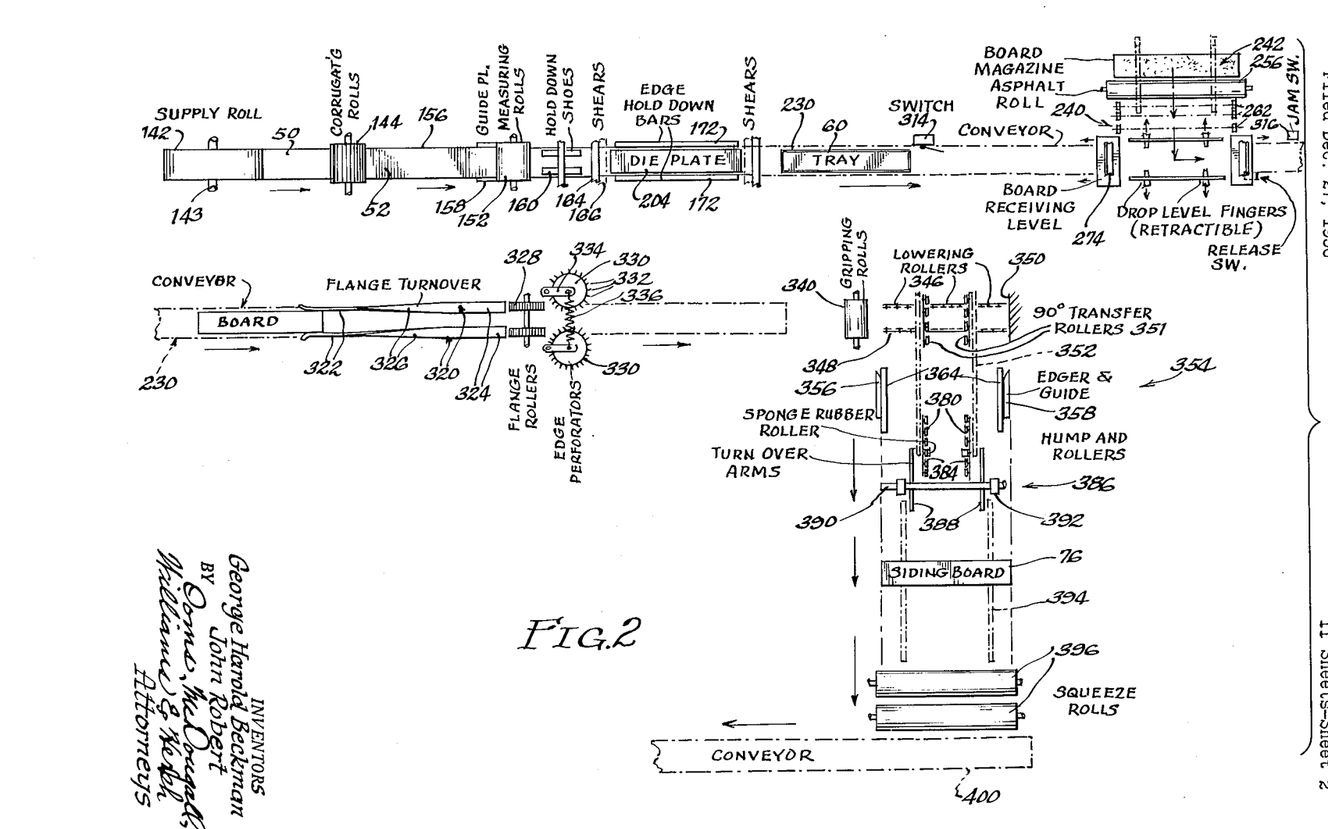
FIG. 2 is a diagrammatic plan view of the machine of FIG. 1.

The board feeding and dropping mechanism 240, the flange turnover bars 320 and the pressing rollers 328 may be substantially the same as illustrated in FIGS. 1, 2 and 11–16. However, the perforating rollers 330 are not employed in making the modified board 102. The pressure rollers 340 and 342 are also omitted. Thus, the conveyor 230 delivers the boards 102 directly onto a series of rollers 440 and against a stop wall 442 which brings the boards to rest. The boards are carried away at ninety degrees by the conveyor 352, which may be substantially the same as shown in FIGS. 1 and 2.

Figure 22:
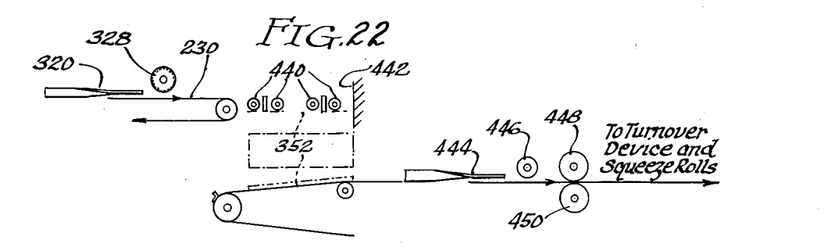
FIG. 22 is a diagrammatic elevational view of modified components for turning over the side and end flanges.
Figure 23:
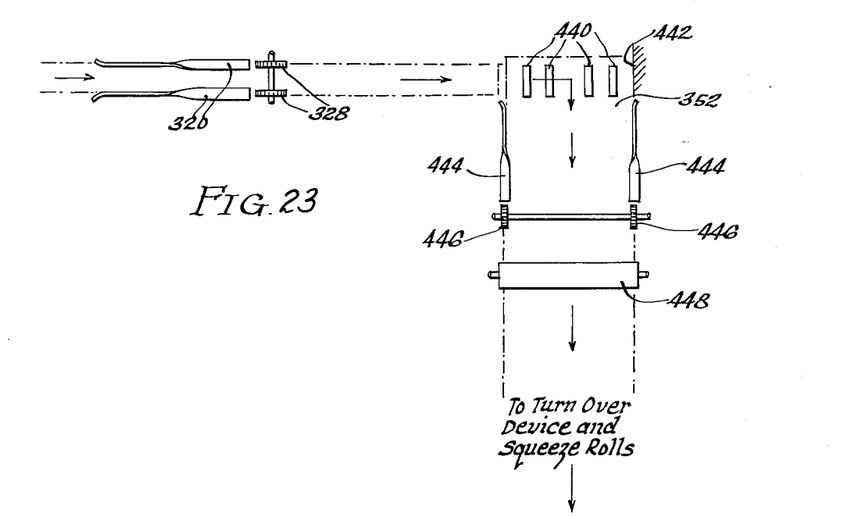
FIG. 23 is a diagrammatic plan view showing the modified arrangement of FIG. 22.

In order to turn the end flanges 110 inwardly, the modified arrangement of FIGS. 22 and 23 is provided with a pair of additional turnover bars 444 which are substantially the same in construction as the turnover bars 320.

After leaving the turnover bars 444, the boards pass under a pair of corrugated pressing rollers or wheels 446 which iron down the end flanges 110. The rollers 446 are similar to the rollers 328. Next, the boards 102 are fed between pressure rollers 448 and 450 which apply squeezing pressure to the boards so that the metal cover 104 will be firmly and uniformly pressed against the insulating board 106. From the rollers 448 and 450, the boards pass to the turnover devices 386, the conveyor 394, the squeeze rollers 396 and 398, and the conveyor 400 of FIGS. 1 and 2.

It may be helpful to summarize the operation of the machine shown in FIGS. 1–20. The sheet metal strip 50 is unrolled from the supply roll 142 and is fed between the corrugated rollers 144 and 146, which corrugate the strip transversely to its length. The corrugated strip 52 passes along the slack loop 156 and is fed intermittently along the supporting table 150 by the intermittently driven feed rollers 152 and 154. The feed rollers 152 and 154 are effective to measure out the necessary length of the strip 52 to form each successive sheet 54.

When the strip 52 has been fed into position on the table 150, the edges of the strip are clamped against the table by the holddown bars 172. Then, the sheet 54 is cut from the strip 52 by the knives 164 and 166. At the same time, the knives 168 and 170 trim the opposite end of the sheet 54, so as to form the sheet 54 into the shape shown in FIGS. 25 and 32.

The sheet 54 is released by the holddown bars 172 and is pushed through the die opening 162 by the die plate 204, so as to bend the side and edge flanges 56 and 58, generally at right angles to the sheet. The tray 60, thus formed, drops onto the conveyor 230, which carries the tray to the feeding and dropping mechanism 240.

Each successive board 40 is fed from the board magazine 242 by the conveyor 252, which pushes the lowermost board under the barrier wall 246. If one of the trays 60 is missing on the conveyor 230, the safety switch 314 is not operated, with the result that the air cylinders 312 maintain the stack of boards in a raised position, out of the reach of the conveyor 252, so that no board will be fed. Normally, each successive tray operates the switch 314 and thereby causes the air cylinders 312 to lower the stack so that a board will be fed.

The board passes from the magazine 242 to the rollers 256 and 258. The lower roller 258 applies hot asphalt or some other suitable cement to the under side of the board. From the rollers 256 and 258, the board travels downwardly and forwardly along the rollers 262 and is deposited on the bars 274, which support the extreme ends of the board. Next, the bars 274 are moved outwardly by the air cylinder 278 so as to drop the board onto the fingers 290, which engage the extreme edges of the board. As the tray 60 passes under the board dropping mechanism, it trips the switch 298. As a result, the solenoids 292 are energized so as to withdraw the fingers 290. The board then drops into the underlying tray 70.

The conveyor 230 carries the assembled board and tray under the turnover bars 320, which fold the side flanges 56 inwardly over the edge portions 42 of the board 40. The side flanges 56 are pressed down by the weight of the corrugated rollers 328. The perforating wheels 330 form weep holes 94 in the side flanges 56.

Next, the conveyor 230 feeds the boards between the squeeze rollers 340 and 342. The boards pass along the rollers 346 and come to rest against the stop wall 350. Each successive board is lowered by the rollers 346 onto the rollers 351 and is carried away at ninety degrees by the conveyor 352.

The board 76 passes between the ironing bars 356, which press the end flanges 58 inwardly so that they will be straight and true. In addition, the bars 356 turn in the edge portions 75a and 75b of the flanges 58, over the bevels 75a and 75b. While passing between the ironing bars 356, the board is held down by the spring shoes 364.

From the conveyor 352, the boards pass to the turnover device 386, which turns over each successive board and deposits it on the conveyor 394. Finally, the boards are fed between the squeeze rollers 396 and 398 and are deposited on the conveyor 400.

It will be apparent that the apparatus of the present invention will produce metal covered boards which are well adapted for use as siding shingles, roofing shingles, table pads, and the like. Any desired type of board may be covered with any suitable type of sheet metal. The edge and end flanges of the sheet metal cover may be folded against and over the edges of the board so as to form finished edges which are square and true and are adapted to be abutted tightly against the corresponding edges of other boards. The sheet metal may be corrugated or may be given any other suitable finish. Moreover, the sheet metal cover may be firmly cemented to the underlying board so that the cover will be smoothly and rigidly supported by the board. A variety of boards may be formed with slightly modifications of the apparatus employed in making the boards.

The finished boards are strong, rigid and attractive in appearance. Moreover, they have a high thermal insulating value.

Various modifications, alternative constructions, and equivalents may be employed without departing from the true spirit and scope of the invention as exemplified in the foregoing description and defined in the following claims.

We claim:

1. In a machine for making metal covered boards, a mechanism for inserting boards into sheet metal trays, said mechanism comprising a conveyor for receiving and carrying the trays, a magazine along the conveyor for holding a stack of boards to be covered, said magazine including a support for the bottom board in the stack, a stop plate having a lower edge spaced above the level of the support by an amount corresponding to the thickness of the boards, pusher means for engaging the bottom board and pushing the board under the lower edge of the stop plate, power lift means for engaging the bottom board and raising the stack so that the bottom board will be above the pusher means, means operable by a tray approaching said magazine on said conveyor for causing said power lift means to lower the stack, said power lift means being operative to raise the stack and prevent the feeding of a board in the absence of a tray, means adjacent said magazine for applying an adhesive coating to the underside of the bottom board fed therefrom, and means for dropping the adhesive coated board into the tray.

2. In a machine for making metal covered boards, a mechanism for inserting boards into trays, said mechanism comprising a conveyor for receiving and carrying the trays, a magazine along the conveyor for holding a stack of boards to be covered, said magazine including a support for the bottom board in the stack, a barrier having a lower edge spaced above the level of the support by an amount corresponding to the thickness of the boards, feeder means for engaging the bottom board and feeding the board under the barrier, power lift means for engaging the bottom board and raising the stack so that the bottom board will be above the feeder means, means operable by a tray approaching said magazine on said conveyor for causing said power lift means to lower the stack, said power lift means being operative to raise the stack and prevent the feeding of a board in the absence of a tray, and means for receiving the board from the magazine and dropping the board into the tray on the conveyor.

3. In a machine for handling trays or similar articles, a conveyor having a plurality of carriers for receiving and carrying successive trays, means for depositing the successive trays on the successive carriers, each carrier having a rearwardly disposed upwardly projecting pusher thereon for advancing the tray carried by said carrier, a retarding member extending into the path of the successive trays carried by said carrier, said retarding member being engageable by the front of each tray to push the tray back against the corresponding pusher, and means supporting said retarding member for yielding forward movement to provide for movement of said trays past said retarding member.

4. In a machine for handling trays or the like, a conveyor having a plurality of carriers for receiving and carrying successive trays, means for depositing the successive trays on the successive carriers, each of said carriers having a pusher thereon for engaging the rear of the tray to advance the tray, a retarding member extending into the path of the successive trays carried on said carriers, means supporting said retarding member for movement forwardly and out of the path of the trays, and means yieldably biasing said retarding member rearwardly and into the path of the trays, said member thereby being engageable by the front of each tray to push the tray rearwardly against the corresponding pusher, said retarding member being yieldable to provide for movement of the trays past said yieldable member.

5. In a machine for handling trays or the like, a conveyor having a plurality of carriers for receiving and carrying the trays, means for depositing the successive trays on the successive carriers, each of said carriers having an upwardly projecting pusher and an upwardly projecting front stop at opposite ends of said carrier, one of said trays being receivable on each of said carriers between said pusher and said front stop, said pusher having an overhanging lip for covering the upper edge of the rear flange on the tray, an arm disposed along said conveyor and extending upwardly into the path of each successive carrier and the tray carried thereby for engagement by the front edge of the tray to push the tray rearwardly against said pusher, yieldable means biasing said arm rearwardly, and stop means limiting rearward swinging movement of said arm, said arm being swingable forwardly to provide for movement of said carriers and the trays carried thereby past said arm.

6. In a machine for making metal-covered boards, the combination comprising first means for forming sheet metal into a series of trays, a conveyor movable adjacent said first means for receiving the successive trays, said first means being effective to place the trays on said conveyor, said conveyor having carrier means for positively and accurately locating the trays on the conveyor, second means for operating said first means in timed relation to the movement of said conveyor, a board feeding mechanism for placing boards in the successive trays on said conveyor, and third means for operating said board feeding mechanism in timed relation to the movement of said conveyor.

7. In a machine for making metal-covered boards, the combination comprising first means for forming sheet metal into a series of trays, a conveyor movable adjacent said first means for receiving the successive trays, said first means being effective to place the trays on said conveyor, said conveyor having carrier means for positively and accurately locating the trays on the conveyor, second means for operating said first means in timed relation to the movement of said conveyor, a board feeding mechanism for placing boards in the successive trays on said conveyor, third means for operating said board feeding mechanism in timed relation to the movement of said conveyor, and fourth means for detecting the presence of the successive trays on the conveyor as said carrier means approach said board feeding mechanism and for preventing the operation of said board feeding mechanism if a tray is missing from the conveyor.

8. In a machine for making metal-covered boards, the combination comprising first means for forming sheet metal into a series of trays, a conveyor movable adjacent said first means for receiving the successive trays, said first means being effective to place the trays on said conveyor, said conveyor having carrier means for positively and accurately locating the trays on the conveyor, second means for operating said first means in timed relation to the movement of said conveyor, a board feeding mechanism for placing boards in the successive trays on said conveyor, third means for operating said board feeding mechanism in timed relation to the movement of said conveyor, and anti-jamming means operable by any board that may project above one of said trays for stopping said conveyor.

9. In a machine for making metal-covered boards, the combination comprising first means for forming sheet metal into a series of trays with edge flanges thereon, a conveyor movable adjacent said first means for receiving the successive trays, said first means being effective to place the trays on said conveyor, said conveyor having carrier means for positively and accurately locating the trays on the conveyor, second means for operating said first means in timed relation to the movement of said conveyor, a board feeding mechanism for placing boards in the successive trays on said conveyor, third means for operating said board feeding mechanism in timed relation to the movement of said conveyor, and fourth means engageable with the moving trays on said conveyor downstream from said board feeding mechanism for turning in the flanges on the trays over the corresponding edge portions of the boards, said carrier means being effective to advance said trays in a positive manner past said fourth means.

10. In a machine for making metal-covered boards, the combination comprising first means for forming sheet metal into a series of trays with edge flanges thereon, a conveyor movable adjacent said first means for receiving the successive trays, said first means being effective to place the trays on said conveyor, said conveyor having carrier means for positively and accurately locating the trays on the conveyor, second means for operating said first means in timed relation to the movement of said conveyor, a board feeding mechanism for placing boards in the successive trays on said conveyor, third means for operating said board feeding mechanism in timed relation to the movement of said conveyor, fourth means engageable with the moving trays on said conveyor downstream from said board feeding mechanism for turning in the flanges on the trays over the corresponding edge portions of the boards, said carrier means being effective to advance said trays in a positive manner past said fourth means, and antijamming means disposed between said board feeding mechanism and said fourth means for stopping said conveyor in response to any board that may project above the corresponding tray.

11. In a machine for making metal-covered boards, the combination comprising a die having an opening therein, a conveyor movable past said opening, first means for feeding sheet metal across said opening, a punch for forcing the sheet metal through said opening to form trays and to place the trays on the conveyor, said conveyor having carrier means for accurately positioning the trays on the conveyor, second means for operating said punch in timed relation to the movement of said conveyor, a board feeding mechanism for placing boards in the successive trays on the conveyor, and means for operating the board feeding mechanism in timed relation to the movement of said conveyor.

References Cited in the file of this patent

UNITED STATES PATENTS

| | | |
|---|---|---|
| 140,920 | Herzberg | July 15, 1873 |
| 420,912 | Morningstar | Feb. 4, 1890 |
| 691,261 | Graham | Jan. 14, 1902 |
| 1,022,367 | Janpole | Apr. 2, 1912 |
| 1,075,845 | Mills | Oct. 14, 1913 |
| 1,700,945 | Loppacker | Feb. 5, 1929 |
| 1,749,342 | Hazen | Mar. 4, 1930 |
| 1,894,415 | Onstad | Jan. 17, 1933 |
| 2,058,498 | Perry | Aug. 27, 1936 |
| 2,154,143 | Whelan | Apr. 11, 1939 |
| 2,195,959 | Maguire | Apr. 2, 1940 |
| 2,216,206 | McKee | Oct. 1, 1940 |
| 2,253,639 | McMahan | Aug. 26, 1941 |
| 2,278,331 | Meyercord | Mar. 31, 1942 |
| 2,401,652 | Mizrach | June 4, 1946 |
| 2,436,192 | Braun | Feb. 17, 1948 |
| 2,627,966 | Moyer | Feb. 10, 1953 |
| 2,712,513 | Breslow | July 5, 1955 |
| 2,715,597 | Hosfield | Aug. 16, 1955 |
| 2,764,217 | Goettsch | Sept. 25, 1956 |
| 2,765,837 | Kenyon | Oct. 9, 1956 |
| 2,772,717 | Ware | Dec. 4, 1956 |
| 2,777,563 | Lubersky | Jan. 15, 1957 |